United States Patent [19]
Kato et al.

[11] Patent Number: 5,252,085
[45] Date of Patent: Oct. 12, 1993

[54] CLOCK SPRING CONNECTOR

[75] Inventors: Hironori Kato, Sendai; Kunihiko Sasaki, Miyagi; Hiroyuki Bannai, Furukawa, all of Japan

[73] Assignee: Alps Electric Co., Ltd., Tokyo, Japan

[21] Appl. No.: 4,817

[22] Filed: Jan. 15, 1993

[30] Foreign Application Priority Data

Jan. 27, 1992 [JP] Japan .................................. 4-011990

[51] Int. Cl.$^5$ ............................................ H01R 35/04
[52] U.S. Cl. ............................................ 439/164; 439/15
[58] Field of Search .................................. 439/15, 164

[56] References Cited

U.S. PATENT DOCUMENTS

| | | | |
|---|---|---|---|
| 3,763,455 | 10/1973 | Confer et al. | 439/15 |
| 4,540,223 | 9/1985 | Schmerda et al. | 439/15 |
| 4,921,428 | 5/1990 | Sasaki et al. | 439/15 |
| 5,171,153 | 12/1992 | Kubota et al. | 439/15 |

Primary Examiner—Gary F. Paumen
Attorney, Agent, or Firm—Guy W. Shoup; Patrick T. Bever

[57] ABSTRACT

A clock spring connector which has a shorter length of a flexible cable and can suppress noises. In a ring-shaped space between an outer cylindrical portion of a first housing and an inner cylindrical portion of a second housing, there are disposed a flexible cable wound in opposite directions with a reversely looped portion being at a U-turn point, and a carrier member rotatable following the reversely looped portion. A spacer as part of the carrier member slides over a rib provided on a bottom plate of the first housing.

12 Claims, 5 Drawing Sheets

CLOCK SPRING CONNECTOR

FIELD OF THE INVENTION

The present invention relates to a clock spring connector for use in an automobile steering device or the like to make electrical connection between a stationary member and a movable member by utilizing a flexible cable.

DESCRIPTION OF THE RELATED ART

A clock spring connector is arranged such that a stationary member and a movable member mounted rotatably with respect to the stationary member are interconnected by a flexible cable, and it has been employed as electrical connecting means between the stationary member and the movable member which is rotatable an infinite number of revolutions relative to the former as encountered in an automobile steering device.

In that type clock spring connector, the flexible cable takes a substantial part of the total cost. For this reason, U.S. Pat. No. 3,763,455 proposes a clock spring connector which is aimed at reducing the length of a flexible cable required and cutting down the cost.

FIG. 9 is a top plan view showing the schematic construction of the clock spring connector disclosed in the above-cited U.S. Patent. As shown in the figure, a movable member 101 is mounted rotatably with respect to a stationary member 100 having a cylindrical shape, and flexible cables 103, 104 are stored in a ring-shaped space 102 defined between the movable member 101 and the stationary member 100. More specifically, these flexible cables 103, 104 are led out of the space 102 with their end portions fixed to the movable member 101 and the stationary member 100, respectively, and are stored in the space 102 such that they are wound in opposite directions upon an outer cylindrical portion as part of the stationary member 100 and an inner cylindrical portion as part of the movable member 101, with a reversed portion in a U-shape being formed at each position where the direction of winding of the flexible cable is reversed. Further, two groups of rollers 105, 106 are arranged within the space 102 to roll in the circumferential direction. The reversed portion of the flexible cable 103 is looped around one roller of the one group of rollers 105, and the reversed portion of the flexible cable 104 is looped around one roller of the other group of rollers 106.

In the clock spring connector thus constructed, when the movable member 101 is rotated in the clockwise direction, for example, in FIG. 9, the reversely looped portions of the flexible cables 103, 104 are moved within the space 102 in the clockwise direction through a smaller amount of revolutions than that of the movable member 101, thus bringing the flexible cables 103, 104 into a wound-up state that they are wrapped in a larger amount of revolutions upon the inner cylindrical portion of the stationary member 100. On the contrary, when the movable member 101 is rotated in the counterclockwise direction, the reversely looped portions of the flexible cables 103, 104 are moved in the counterclockwise direction through a smaller amount of revolutions than that of the movable member 101, thus bringing the flexible cables 103, 104 into an unwound state that they are wrapped in a larger amount of revolutions upon the outer cylindrical of the movable member 101. When wound-up and unwound, the rollers 105, 106 are moved in the counterclockwise and clockwise direction, respectively, while receiving forces from the reversely looped portions of the flexible cables 103, 104.

With the above conventional clock spring connector, because the flexible cables are each wound in opposite directions upon the inner and outer cylindrical portions, the length of the flexible cable required can be cut down remarkably in comparison with a clock spring connector of the type that the flexible cable is wound (into the spiral form) upon the inner and outer cylindrical portions in the same direction. Also, because a plurality of rollers are disposed between those loops of the flexible cable wound upon the inner cylindrical portion and those loops of the flexible cable wound upon the outer cylindrical portion, the flexible cable can be restricted in the radial direction almost the entire circumference of the ring-shaped space, making it possible to smoothly wind up or unwind the flexible cable.

However, the clock spring connector constructed as mentioned above has suffered from the problem that since the rollers are moved within the space in the circumferential direction while being held at their lower end faces closely against a member defining the bottom surface of the space, there cause large noisy sounds of sliding due to friction therebetween. If a sufficient clearance is set to be left between upper end faces of the rollers and a member defining the top surface of the space, the above noisy sounds of sliding could be reduced to some extent. But the presence of such a clearance causes the rollers to move up and down, which has raised the problem that the rollers strike against the members defining the top and bottom surfaces of the space and collision noises are produced.

SUMMARY OF THE INVENTION

The present invention has been made in view of the above-mentioned state of art, and an object of the invention is to provide a clock spring connector which is inexpensive and can suppress noises.

To achieve the above object, a primarily feature of the present invention resides in a clock spring connector comprising a stationary member, a movable member mounted rotatably with respect to the stationary member, a flexible cable stored in a space between an inner cylindrical portion provided on one of the stationary member and the movable member and an outer cylindrical portion provided on the other, and a carrier member disposed in the space and having an opening, the flexible cable being reversely looped to provide a U-turn point in the opening of the carrier member and wound in opposite directions upon the inner cylindrical portion and the outer cylindrical portion, wherein a projection is provided between the carrier member and at least one of a top surface and a bottom surface of the space for making smaller a contact area between the carrier member and one of the top surface and the bottom surface.

Another feature of the present invention is in that the projection is provided on at least one of the carrier member and the top surface and the bottom surface of the space, and more particularly in that the projection is provided on the carrier member.

Still another feature of the present invention is in that a ring-shaped recessed groove is provided on at least one of the the top surface and the bottom surface of the space in facing relation to the carrier member for guiding the carrier member in the circumferential direction. Additional feature of the present invention is in that the projection is provided on at least one of the top surface and the bottom surface of the space in facing relation to the flexible cable.

Yet another feature of the present invention is in that the projection is in the form of a radial rib and/or an annular rib.

When the movable member is rotated in one direction with respect to the stationary member, the flexible cable is wound up upon the inner cylindrical portion or unwound upon the outer cylindrical portion through the reversely looped portion. At this time, the reversely looped portion is moved within the space in the same direction through a smaller amount of revolutions than that of the movable member, and the carrier member is also moved within the space to revolve in the same direction following the reversely looped portion. Because of the projection being provided between the carrier member and the stationary member to make smaller a contact area therebetween, noises due to sliding of the carrier member are suppressed and the carrier member can be smoothly moved within the space with no need of leaving a clearance between the carrier member and the top surface of the space.

DETAILED DESCRIPTION OF THE PREFERRED EMBODIMENTS

Hereinafter, preferred embodiments of the present invention will be described with referent to the drawings.

Figure 1:
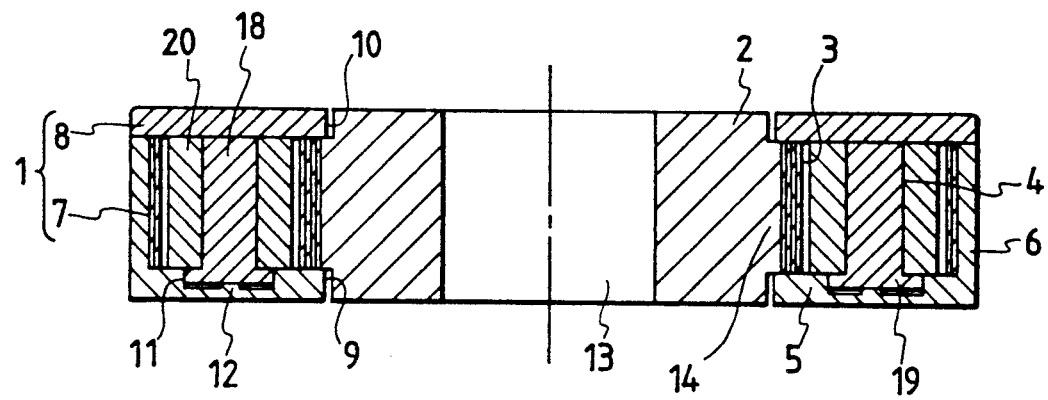
FIG. 1 is a vertical sectional view of a clock spring connector according to a first embodiment of the present invention.
Figure 9:
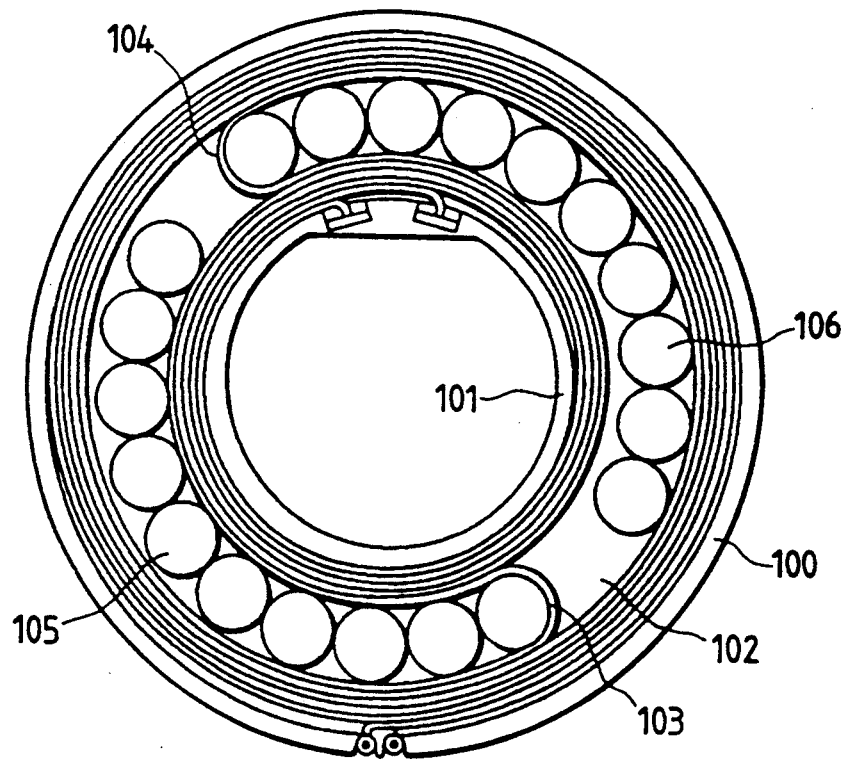
FIG. 9 is a top plan view of a clock spring connector according to the prior art.
Figure 2:
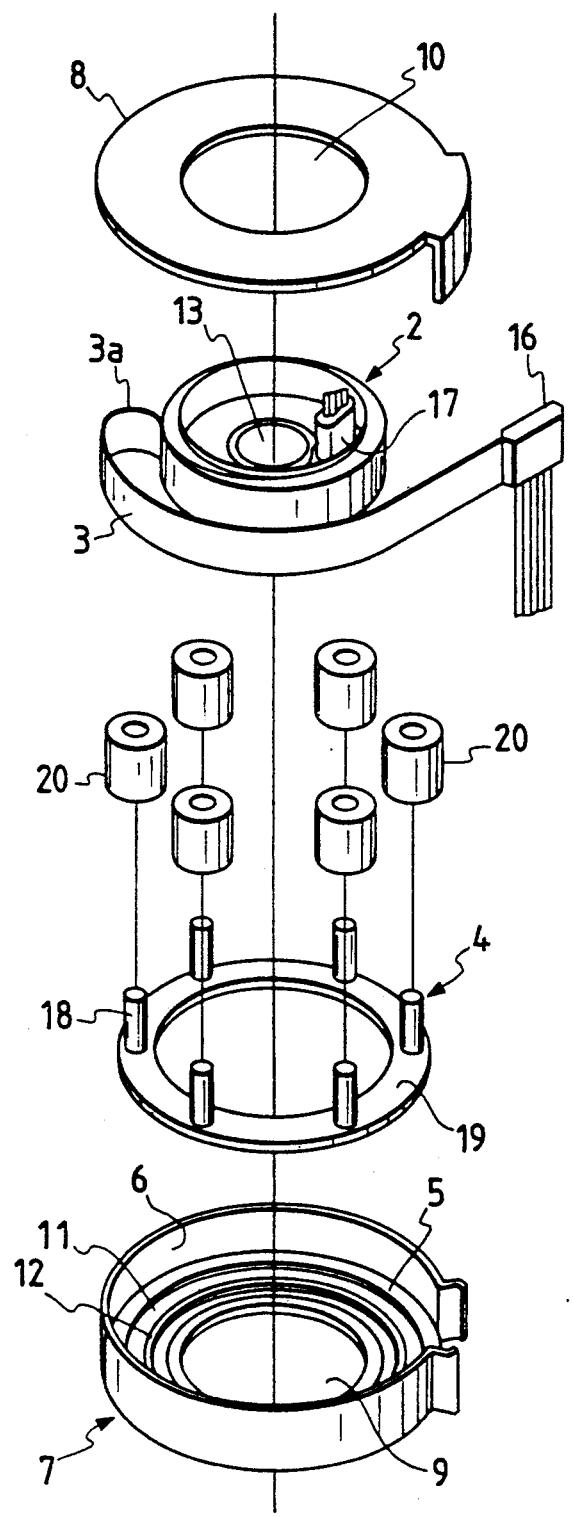
FIG. 2 is an exploded perspective view of the clock spring connector shown in FIG. 1.
Figure 3:
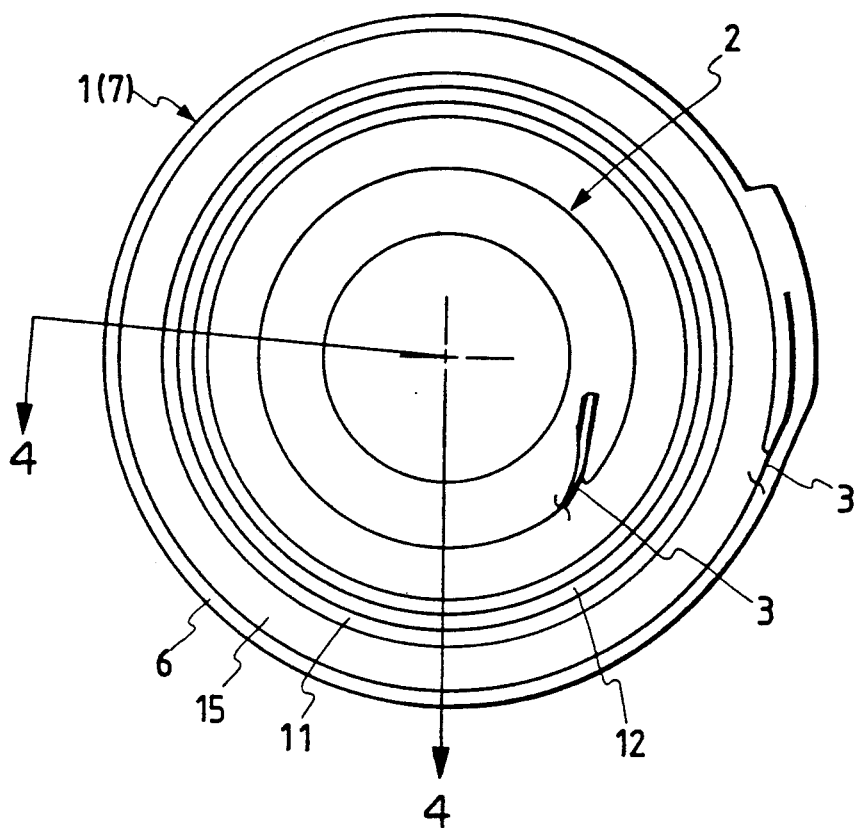
FIG. 3 is a top plan view of principal parts of the clock spring connector shown in FIG. 1.
Figure 4:
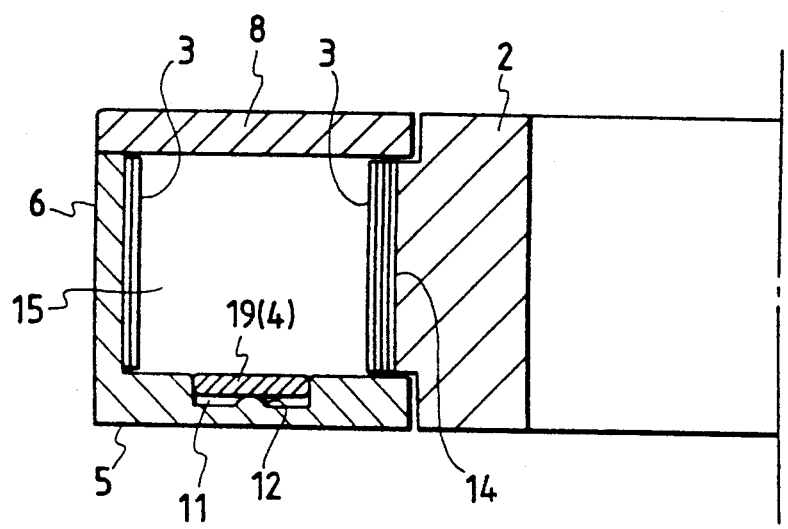
FIG. 4 is a sectional view taken along line 4—4 in FIG. 3.

FIG. 1 is a vertical sectional view of a clock spring connector according to a first embodiment of the present invention, FIG. 2 is an exploded perspective view of the clock spring connector, FIG. 3 is a top plan view of principal parts of the clock spring connector, and FIG. 4 is an enlarged sectional view taken along line 4—4 in FIG. 3.

As shown in these figures, a clock spring connector according to this embodiment primarily comprises a first housing 1, a second housing 2 mounted rotatably with respect to the first housing 1, a flexible member 3 stored between both the housings 1, 2, and a carrier member 4 rotatably disposed between both the housings 1, 2.

The first housing 1 comprises a lower case 7 provided with an outer cylindrical portion 6 upstanding at the peripheral edge of a base plate 5, and an upper cover 8 integrally joined to an upper end of the outer cylindrical portion 6. Center holes 9, 10 are bored at the centers of the bottom plate 5 of the lower case 7 and the upper cover 8, respectively. A guide groove 11 having a ring-shaped shape as viewed from above is provided in the bottom plate 5 and an annular rib 12 is projected at the center of the guide groove 11.

The second housing 2 comprises a cylindrical member having a shaft insertion hole 13 at the center. The second housing 2 is rotatably coupled to the first housing 1 in such a manner that the outer peripheral edge of the second housing 2 is guided at its upper and lower ends by the center holes 9, 10 in the lower case 7 and the upper cover 8, respectively. As will be seen from FIGS. 3 and 4, a space 15 having a ring-like shape as viewed from above is defined by the bottom plate 5, the outer cylindrical portion 6 and the upper cover 8 on the side of the first housing 1, as well as by an inner cylindrical portion 14 which is part of the second housing 2 and provides a circumferential surface of the same.

The flexible cable 3 comprises a so-called flat cable of the type that a plurality of conducting wires parallel to each other are laminated by using a pair of insulating films. This embodiment uses a flat cable for five lines in which five conducting lines are embedded. One end of the flexible cable 3 is connected to a first connector 16 fixed to the outer cylindrical portion 6 and led out of the first housing 1 via the first connector 16. Meanwhile, the other end of the flexible cable 3 is connected to a second connector 17 fixed to the inner cylindrical portion 14 and led out of the second housing 2 via the second connector 17. Further, the flexible cable 3 is stored in the space such that it is wound in the clockwise direction along an inner wall of the outer cylindrical portion 6 from the first connector 16, reversely turned while making a U-shaped loop (hereinafter referred to as a reversely looped portion 3a), and then wound in the counterclockwise direction along an outer wall of the inner cylindrical portion 14 from the reversely looped portion 3a to reach the second connector 17.

The carrier member 4 comprises a ring-shaped spacer 19 provided with a plurality of pins 18 upstanding on its upper surface, and rollers 20 rotatably fitted over the respective pins 18. The carrier member 4 is disposed in the space 15 such that the spacer 19 is restricted by the guide groove 11 in radial movement and upper end faces of the rollers 20 are held in contact with a lower surface of the upper cover 8. In addition, the reversely looped portion 3a of the flexible cable 3 is positioned in an opening space between two adjacent rollers among a group of the rollers 20.

Operation of the clock spring connector according to this embodiment will now be described taking, as an example, the case where the first housing 1 is used as a stationary member and the second housing 2 is used as a movable member.

When the second housing 2 is rotated in the clockwise direction from a neutral position where the flexible cable 3 is wound upon the outer cylindrical portion 6 of the first housing 1 and the inner cylindrical portion 14 of the second housing 2 in almost the same amount of revolutions, the reversely looped portion 3a of the flexible cable 3 is moved in the clockwise direction through a smaller amount of revolutions than that of the second housing 2. The group of the rollers 20 and the spacer 19 are also moved in the clockwise direction following the reversely looped portion 3a, whereby the flexible cable 3 is let out from the side of the inner cylindrical portion 14 and wrapped on the side of the outer cylindrical portion 6 by a length corresponding to about twice the amount of revolving movement of the reversely looped portion 3a. At this time, since the spacer 19 and the first housing 1 are held in contact with each other via the rib 12 provided on the base plate 5 with a small coefficient of friction, the spacer 19 is smoothly revolved to slide in the space 15 while being guided by the guide groove 11. As a result, noisy sounds of sliding generated upon the movement of the spacer 19 are diminished.

To the contrary, when the second housing 2 is rotated in the counterclockwise direction from the aforesaid neutral position, the reversely looped portion 3a of the flexible cable 3 and the carrier member 4 are moved through a smaller amount of revolutions than that of the second housing 2, whereby the flexible cable 3 is let out from the side of the outer cylindrical portion 6 and wrapped on the side of the inner cylindrical 14 by a length corresponding to about twice the amount of revolving movement of the reversely looped portion 3a. In this case, too, since the spacer 19 and the first housing 1 are contacted with each other via the rib 12 with a small coefficient of friction, the spacer 19 is smoothly revolved to slide in the space 15 while being guided by the guide groove 11. As a result, noisy sounds of sliding generated upon the movement of the spacer 19 are diminished similarly.

With the clock spring connector according to the first embodiment explained above, since the flexible cable 3 is wound in opposite directions upon the outer cylindrical portion 6 and the inner cylindrical portion 14 with the reversely looped portion 3a being at a U-turn point, the length of the flexible cable 3 required can be shortened. As a result, the present clock spring connector is able to cut down the total cost and is advantageous in making the connector size smaller.

Also, since the carrier member 4 is disposed between those loops of the flexible cable 3 wrapped upon the outer cylindrical portion 6 and those loops of the flexible cable 3 wrapped upon the inner cylindrical portion 14 and the reversely looped portion 3a is positioned between a pair of the rollers 20 provided as parts of the carrier member 4, the flexible cable 3 can be prevented by the group of rollers 20 from so expanding outwardly in the radial direction as to buckle on the way to reach the reversely looped portion 3a, when the flexible cable 3 is unwound. It is thus possible to positively carry out the unwinding operation.

Further, since the annular rib 12 is provided on the bottom plate 5 of the first housing 1 so that the spacer 19 and the bottom plate 5 are contacted with each other via the rib 12 with a small coefficient of friction, sounds of sliding generated upon the spacer 19 being revolved to slide in the space 15 can be diminished to suppress resultant noises.

Additionally, since the guide groove 11 is provided in the bottom plate 5 of the first housing 1 to guide the spacer 19 in the circumferential direction, the spacer 19 can be prevented from radially moving to strike against the flexible cable 3 wound upon the outer cylindrical portion 6 or the inner cylindrical portion 14. From this point as well, suppression of noises can be achieved.

Figure 5:
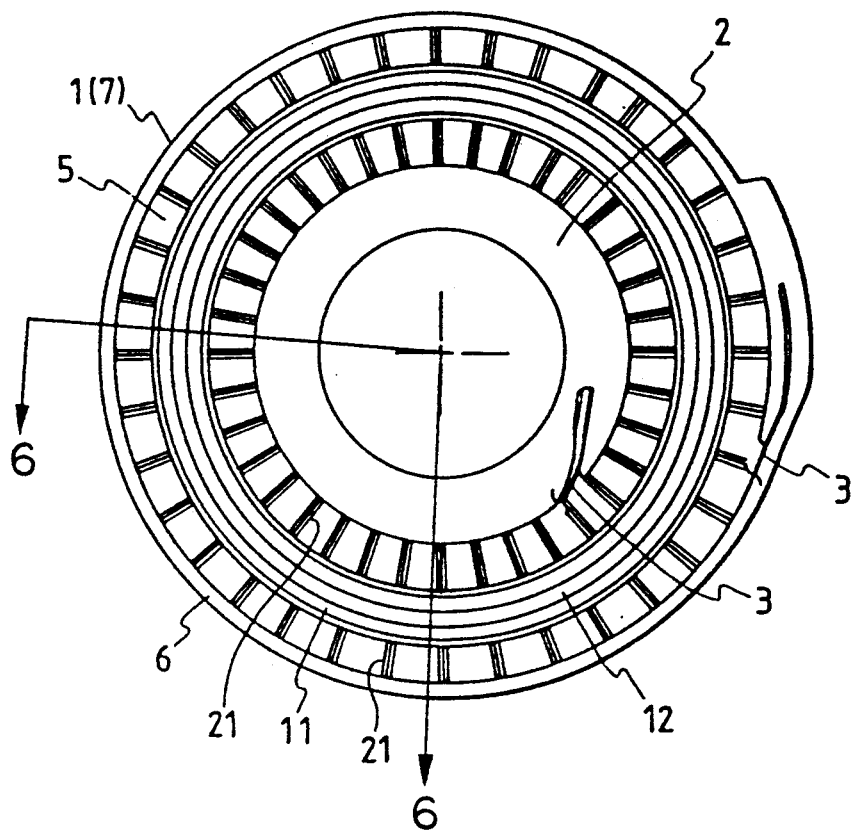
FIG. 5 is a top plan view of principal parts of a clock spring connector according to a second embodiment of the present invention.
Figure 6:
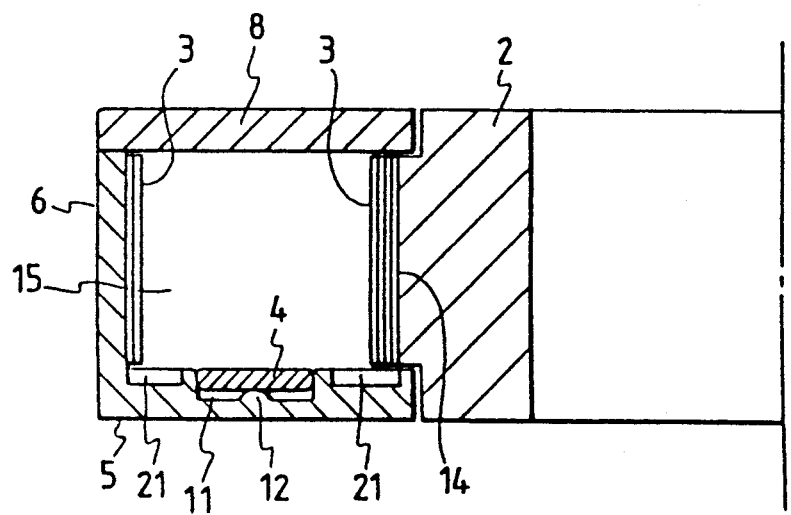
FIG. 6 is a sectional view taken along line 6—6 in FIG. 5.

FIG. 5 is a top plan view of principal parts of a clock spring connector according to a second embodiment of the present invention, and FIG. 6 is a sectional view taken along line 6—6 in FIG. 5. In these figures, the components corresponding to those in FIGS. 1 to 4 are denoted by the same reference numerals.

This embodiment is different from the above first embodiment in that a plurality of other ribs 21 radially extending are provided on the bottom plate 5 at locations other than the guide groove 11. The remaining construction is basically the same between these two embodiments. In this case, since the flexible cable 3 and the bottom plate 5 of the first housing 1 are contacted with each other via the ribs 21 with a small coefficient of friction, noisy sounds generated upon the flexible cable 3 sliding over the bottom plate 5 can be diminished, hence noises can further be suppressed.

Figure 7:
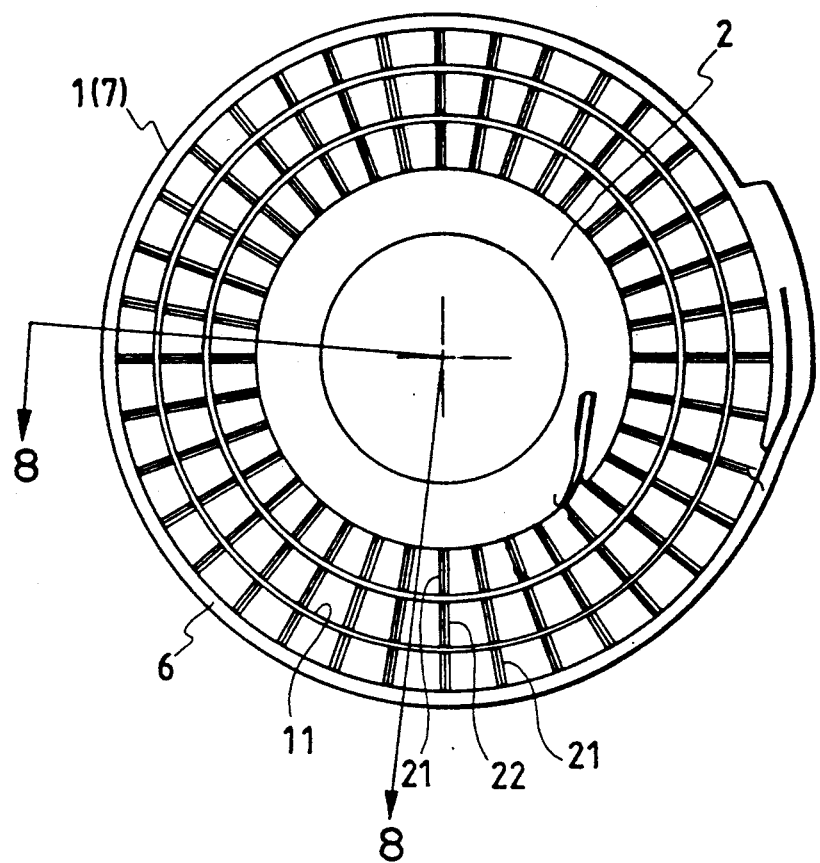
FIG. 7 is a top plan view of principal parts of a clock spring connector according to a third embodiment of the present invention.
Figure 8:
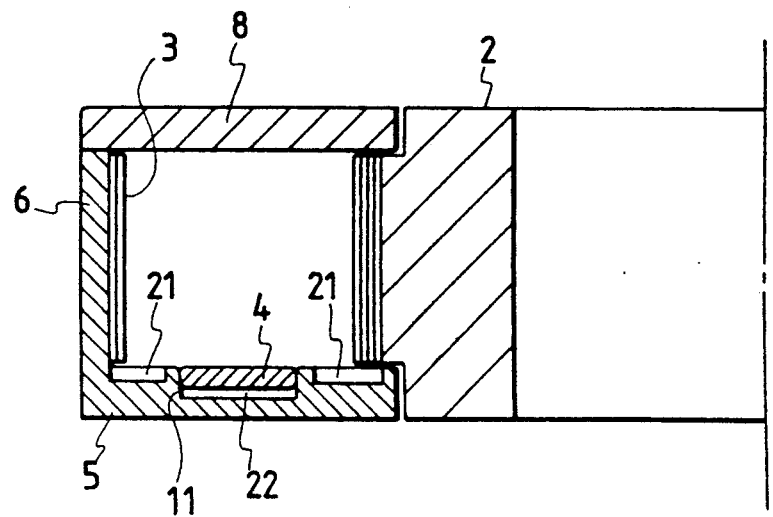
FIG. 8 is a sectional view taken along line 8—8 in FIG. 7.

FIG. 7 is a top plan view of principal parts of a clock spring connector according to a third embodiment of the present invention, and FIG. 8 is a sectional view taken along line 8—8 in FIG. 7. In these figures, the components corresponding to those in FIGS. 5 and 6 are denoted by the same reference numerals.

This embodiment is different from the above second embodiment in that a plurality of still other ribs 22 are provided in the guide groove 11 to extend in the radial direction as with the outer ribs 21. The remaining construction is basically the same between these two embodiments. In this case, there can also be obtained a similar advantage to that in the second embodiment.

It should be noted that while the above embodiments have been explained as interposing the annular rib 12 or the radial ribs 22 between the bottom plate 5 of the first housing 1 an the spacer 19, a plurality of separate projections may be provided instead of the continuous ribs 12, 22. As an alternative, those ribs or projections may be provided on the underside of the spacer 19.

Moreover, while the above embodiments have been explained in connection with the case where the first housing 1 serves as a stationary member and the second housing 2 serves as a movable member, it is conversely also possible to use the first housing 1 as a movable member and the second housing 2 as a stationary member. Further, the configurations of the first and second housings 1, 2 are not limited to those illustrated in the above embodiments. For example, the upper cover 8 may be integral with the second housing 2 and the first housing 1 may have an upwardly open shape provided with the bottom.

Additionally, while the flat cable is illustrated as one example of the flexible cable 3 in the above embodiments, a flexible cable called a round wire cable in which a leading wire is coated with an insulating tube can be used instead of the flat cable. In this case, a plurality of round wire cables corresponding to the number of lines required are held together in the form of a belt.

According to the present invention, as described above, the length of the flexible cable required can be cut down remarkably and noisy sounds generated upon the carrier member moving in the space can be diminished. Consequently, there can be provided a clock spring connector which is inexpensive and produces less noises.

What is claimed is:

1. A clock spring connector comprising a stationary member, a movable member rotatably connected to said stationary member, a flexible cable stored in a space between an inner cylindrical portion provided on one of said stationary member and said movable member and an outer cylindrical portion provided on the other of said stationary member and said movable member, and a carrier member disposed in said space and having an opening, said flexible cable being reversely looped through said opening in opposite directions upon said inner cylindrical portion and said outer cylindrical portion, wherein a projection is provided between said carrier member and at least one of a top surface and a bottom surface of said space for making smaller a contact area between said carrier member and one of said top surface and said bottom surface.

2. A clock spring connector according to claim 1, wherein said projection is provided on at least one of said carrier member and the top surface and the bottom surface of said space.

3. A clock spring connector according to claim 1, wherein said projection is provided on said carrier member.

4. A clock spring connector according to claim 2, wherein a ring-shaped recessed groove is provided on at least one of the top surface and the bottom surface of said space in facing relation to said carrier member for guiding said carrier member in the circumferential direction.

5. A clock spring connector according to claim 2, wherein said projection is provided on at least one of the top surface and the bottom surface of said space in facing relation to said flexible cable.

6. A clock spring connector according to claim 2, wherein said projection is in the form of a radial rib.

7. A clock spring connector according to claim 2, wherein said projection is in the form of an annular rib.

8. A clock spring connector according to claim 4, wherein said projection is provided on at least one of the top surface and the bottom surface of said space in facing relation to said flexible cable.

9. A clock spring connector according to claim 3, wherein said projection is in the form of a radial rib.

10. A clock spring connector according to claim 4, wherein said projection is in the form of a radial rib.

11. A clock spring connector according to claim 3, wherein said projection is in the form of an annular rib.

12. A clock spring connector according to claim 4, wherein said projection is in the form of an annular rib.

* * * * *